(No Model.)
C. PEASE.
Socket for Croquet Wickets.
No. 234,924. Patented Nov. 30, 1880.
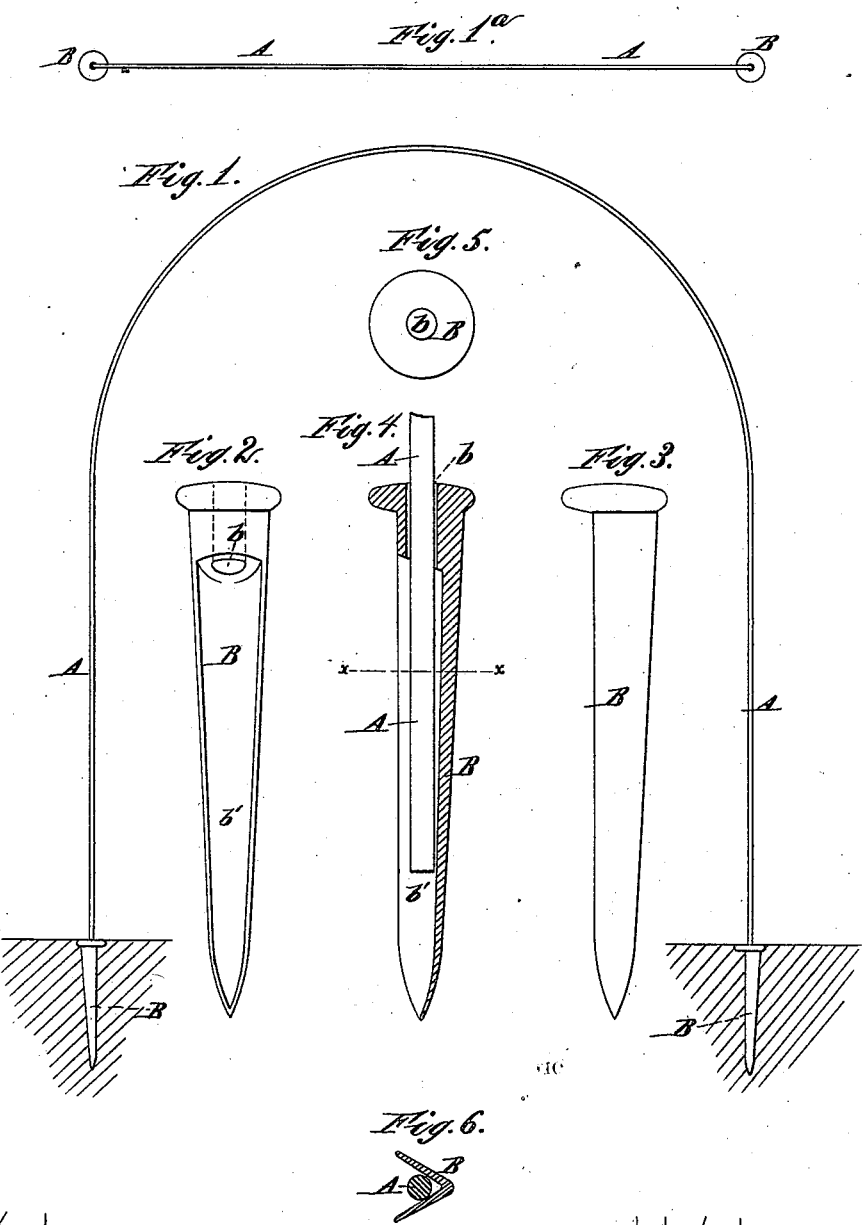

UNITED STATES PATENT OFFICE.

CHARLES PEASE, OF LYNN, MASSACHUSETTS, ASSIGNOR TO HIMSELF, FOREST W. BEALE, AND FRANK PEASE, OF SAME PLACE.

SOCKET FOR CROQUET-WICKETS.

SPECIFICATION forming part of Letters Patent No. 234,924, dated November 30, 1880.

Application filed May 21, 1880. (No model.)

*To all whom it may concern:*

Be it known that I, CHARLES PEASE, of Lynn, in the county of Essex and State of Massachusetts, have invented certain new and useful Improvements relating to Croquet Apparatus, of which the following is a specification.

The curved wire arches known as "wickets" require to be driven in the ground with considerable force, and even then are difficult to set in some situations, and are liable to be imperfectly supported and irregularly placed, especially after the ground has been several times used and the earth has become softened and unreliable.

Sockets of hard wood or metal have been used for various other articles to be set in the earth, but they are always liable to become filled with dirt when out of use. The small size of the wire for the croquet-wicket forbids the covering or plugging of each, as is necessary for success with devices of this kind as ordinarily made.

I have discovered that for the moderate strains to which croquet apparatus are exposed short and simple sockets may be made to serve without any care to protect the holes, the sockets being made each to completely inclose its respective part of the wicket at the surface of the ground, but to only partially inclose it below. In other words, there shall be a space at the side of the hole below, through which space any dirt falling into the small hole in the socket may be forced out by the act of driving down the wicket. I take care to so set the sockets that the wire shall be supported all the way down in the directions in which they are liable to be forced by the blows of the balls.

The accompanying drawings form a part of this specification.

Figure 1 is a front view, showing the wicket in full supported by the sockets. Fig. 1ª is a corresponding plan view. The remaining figures represent the sockets alone on a larger scale. Fig. 2 is a view from the open side. Fig. 3 is a view at right angles to that in Fig. 2. It is a view corresponding to that of Fig. 1. Fig. 4 is a corresponding vertical section. Fig. 5 is a top view of the socket, and Fig. 6 is a horizontal section on line *s s* in Fig. 3.

Similar letters of reference indicate like parts in all the figures.

A is the wicket, formed of iron or steel wire, and is in all respects like the ordinary wickets, and adapted to serve in the ordinary manner by being driven directly in the earth if the sockets become lost or are in any way out of order.

B is a socket, of which I provide two for each wicket, with preferably a surplus, one to each set, to serve in case of loss of one. Each socket B is formed with a hole, *b*, in its upper end. Below the top the socket is triangular in form, with one of the sides of the triangle left off, as shown by sectional view in Fig. 6, giving the liberal opening *b'*, extending from near the top to the bottom of the socket, through which any earth or other solid matter in the interior may be forced out by simply driving down the wicket. In placing the sockets B a stout straight wire may be inserted tightly in the hole *b* and caused to rest, by a suitable shoulder, on the top of the socket. The driving may be done on this wire or bar, and the socket thus placed more truly and perpendicularly than would be otherwise probable.

I claim as my invention—

The croquet-socket described, having the tapering body B, with the hole *b* in the top, adapted to receive and hold an end of the wicket A, and a side opening, *b'*, at a lower level, to allow any dirt entering the socket to be driven out by the subsequent entrance of the wicket, as herein specified.

In testimony whereof I have hereunto set my hand at New York city, New York, this 17th day of May, 1880, in the presence of two subscribing witnesses.

CHARLES PEASE.

Witnesses:
WM. C. DEY,
CHARLES C. STETSON.